United States Patent [19]

Skoworodko

[11] Patent Number: 4,570,319
[45] Date of Patent: Feb. 18, 1986

[54] UNIVERSAL JOINT DISMANTLER

[76] Inventor: Mike Skoworodko, 2250 Cascade St., Abbotsford, British Columbia, Canada, V2T 3G3

[21] Appl. No.: 646,456

[22] Filed: Sep. 4, 1984

[51] Int. Cl.⁴ .................................................. B23P 19/04
[52] U.S. Cl. .................................................. 29/259
[58] Field of Search ................. 29/256, 258, 259, 260

[56] References Cited

U.S. PATENT DOCUMENTS

| | | | |
|---|---|---|---|
| 977,018 | 11/1910 | Kopietz | 29/260 |
| 1,268,541 | 6/1918 | Benedict | 29/260 |
| 1,354,390 | 9/1920 | Gilmore | 29/258 |
| 3,076,259 | 2/1963 | Stebbins | 29/259 |
| 3,142,897 | 8/1964 | Davis | 29/259 |
| 4,120,082 | 10/1978 | Bond | 29/256 |
| 4,463,489 | 8/1984 | James | 29/259 |

Primary Examiner—Robert C. Watson
Attorney, Agent, or Firm—Beehler, Pavitt, Siegemund, Jagger & Martella

[57] ABSTRACT

A device for dismantling a universal joint. The device comprises a bridge member having a central hole formed in it and parallel spaced arms extended at one side. There is a U-shaped grasping member having a threaded hole formed in its top and opposing fingers formed in its lower edge. There is a tightening bolt which is slidably received in the bridge member and threaded in the grasping member. The grasping member is received between the arms of the bridge member and tightening of the bolt draws the grasping member up with respect of the bridge member.

6 Claims, 7 Drawing Figures

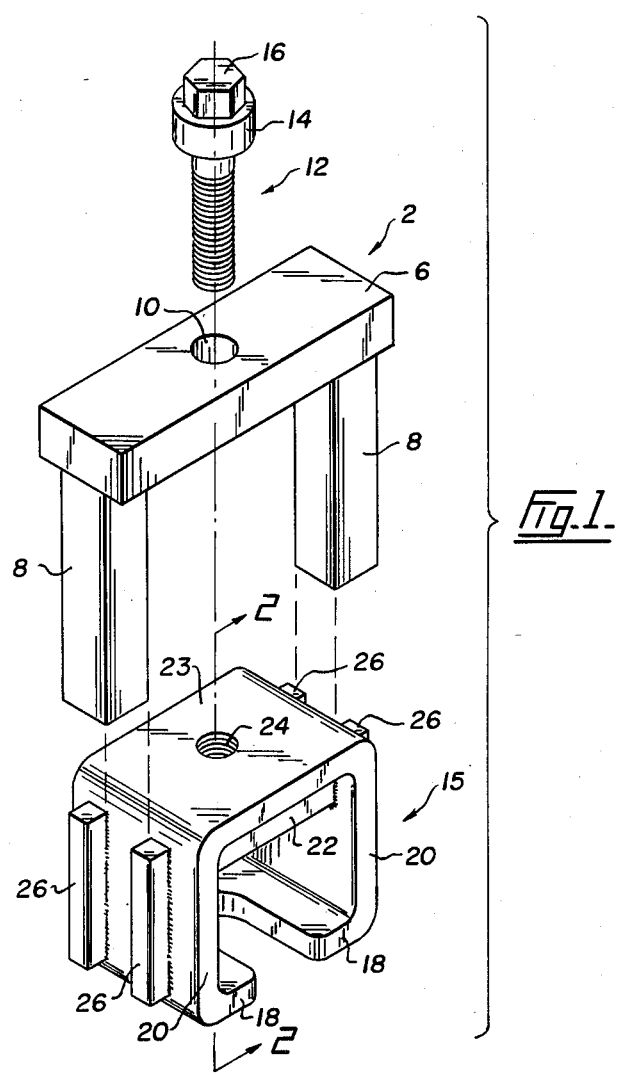
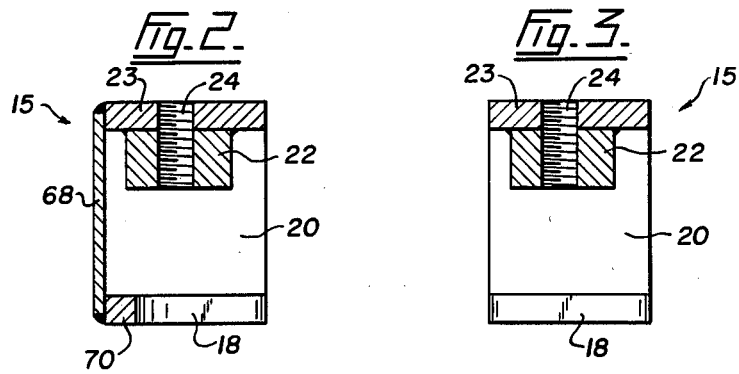

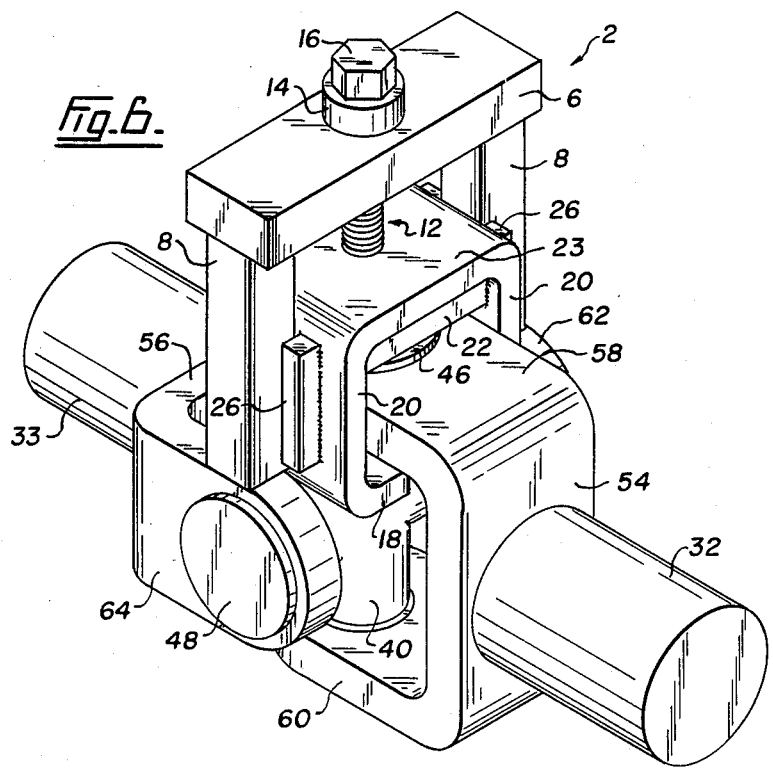
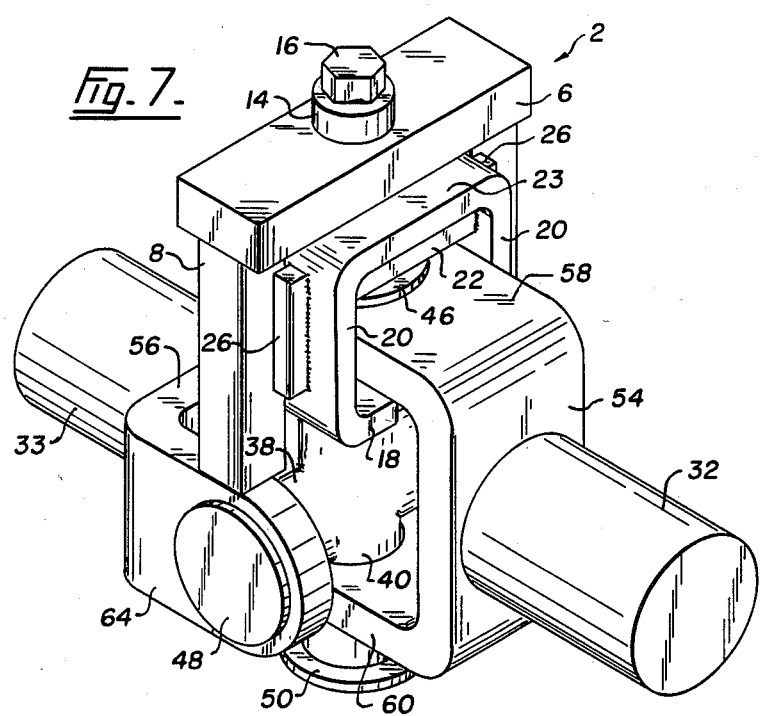

UNIVERSAL JOINT DISMANTLER

FIELD OF THE INVENTION

This invention relates to a device for dismantling universal joints.

DESCRIPTION OF THE PRIOR ART

Conventional universal joints have many applications but are particularly useful on automobile or truck drive shafts for transmitting drive to the final drive from the transmission. In a car where the drive wheels are independently sprung universal joints are commonly used in the drive shafts from the transmission to the road wheels. These universal joints, or Hooke joints, generally comprise two yokes on the ends of adjoining drive shaft sections. The yokes are interconnected by a central element in the form of a cross. The ends of the element are usually journalled in bearing cups which, in turn, are retained in circular apertures formed in each yoke. The universal joints are often sealed with grease for their operating life although grease nipples may be provided.

Of course water and dirt find their way past the seals into the bearing cups when the joint is subjected to the severe stresses and strains of daily use. Foreign particles or impurities in the bearing cup cause pitting and rusting of the bearing surface thus impairing the efficiency of the joint.

Inevitably universal joints wear and must be replaced. The dismantling of a universal joint that has been well maintained can be difficult; dismantling of a universal joint that has been ill-maintained, that is with little regard for its lubrication or cleanliness, is difficult, time consuming and frustrating. Bearing cups are frequently frozen in the yokes regardless of how well the bearing is lubricated as universal joints in drive shafts are exposed to a great deal of road dirt and water. Consequently a mechanic often employs a heavy tool, such as a hammer or the like to force, the bearing cup out of the yoke. Hammering of drive shafts and the like is not desirable. Furthermore the removal of a universal joint by hammering can damage the joint which is undesirable, especially where the joint is dismantled merely for inspection.

Previous devices designed for the dismantling of universal joints are cumbersome, heavy and of complicated structure with many moving parts. They are also expensive to manufacture. As a result little success has been achieved in the commercialization of a useful device to dismantle universal joints.

SUMMARY OF THE INVENTION

The present invention seeks to provide a device for quickly and simple dismantling universal joints without the need for hammering or otherwise exerting excessive force liable to damage the drive shafts or the universal joint, and thus permitting easy routine maintenance. The present invention provides a device that is simple in construction, reliable and robust.

Accordingly, the present invention provides a device for dismantling a universal joint that comprises a bridge member having a central hole formed in it and parallel spaced arms extending from one side; a U-shaped grasping member having a threaded hole formed in its top and opposing fingers formed in its lower edge and a tightening bolt slidably received in the bridge member and threaded in the grasping member, the grasping member being received between the arms of the bridge member whereby tightening of the bolt moves the bridge member downwardly with respect to the grasping member.

DRAWINGS

Aspects of the invention are illustrated, merely by way of example, in the accompanying drawings in which:

FIG. 1 is an exploded view of a device of the present invention;

FIG. 2 is a section on the line 2—2 in FIG. 1;

FIG. 3 shows a variation of the invention;

FIGS. 6 and 7 illustrate the use of the device of the present invention.

DESCRIPTION OF THE PREFERRED EMBODIMENTS

Figure 4:
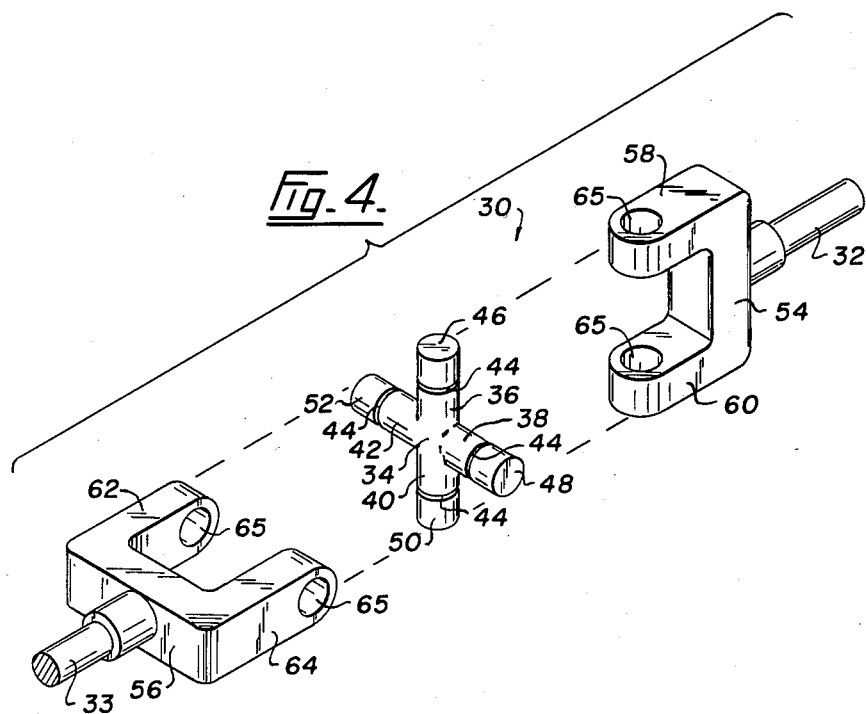
FIG. 4 shows a universal joint.

The joint puller of the present invention comprises a bridge member 2, grasping member 15 and a tightening bolt 12.

The bridge member 2 comprises bar 6 having spaced parallel arms 8 suspended from its ends. The arms 8 are preferably welded to bar 6, as shown, but may be attached to bar 6 in any manner that gives the required strength. There is a hole 10 formed generally in the centre of element 6, between arms 8. Bolt 12 is slidably received in the hole 10, which is slightly larger in diameter than the bolt shank. A conventional bearing 14 may be positioned under head 16 of the bolt 12 to facilitate operation of the device, as discussed later.

Grasping member 15 has the general shape of an inverted U with fingers 18 formed at the end of each side 20. A bracing member 22 may be welded in place in the crux 23 of the U to prevent sides 20 from flexing. A second hole 24 is formed in the upper portion of member 15 and also extends to the bracing member 22. Bolt 12 is threadedly received within the hole 24.

Parallel guiding elements 26 are formed in sides 20 of member 15. When bridge member 2 is brought near grasping member 15, arms 8 of member 2 are slidably received between the guides 26. The provision of elements 26 ensures that subsequent tightening of bolt 12 to operate the device does not allow twisting of member 15 within member 2.

A conventional universal joint 30, secured between two drive shafts 32 and 33, is shown in FIG. 4. The universal joint comprises a central, cross-shaped element 34 having four radiating arms 36, 38, 40 and 42. Bearing cups 46, 48, 50 and 52 are fitted over each bearing surface 44 of arms 36, 38, 40 and 42, each houses a plurality of conventional roller bearings (not shown). A seal on the periphery of the bearing (not shown) is used to retain lubricant within the bearing. Bearing cups 46 and 50 are housed in a yoke 54 secured to drive shaft 32. Similarly bearing cups 48 and 52 are housed in a yoke 56 secured to the second drive shafts 33. Yoke 54 has a pair of spaced parallel arms 58 and 60 in which the bearing cups are received. Yoke 56 has a pair of spaced parallel arms 62 and 64. Opening 65 in the arms receive the cups. Each arm 58, 60, 62 and 64 has an inside surface, that is a surface facing the other arm of the pair 58 and 60 or the pair 62 and 64.

The puller 1 is operated as shown in FIGS. 6 and 7. The joint shown in FIGS. 6 and 7 differs from the joint of FIG. 4 only by the provision of flanges on the bearing cups 46, 48, 50 and 52. Such flanges are used to locate the cups in heavy duty universal joints. As shown in FIG. 6 grasping member 15 is positioned around yoke 54 of drive shaft 32 so that fingers 18 abut the inside surface of arm 58 of yoke 54. Bridge member 2, if not already attached, is secured to puller member 15 by placing bolt 12 through hole 10 and then threading the bolt 12 into hole 24 of member 15. As bolt 12 is tightened it is important to ensure that arms 8 of member 2 are properly received in guides 26. The bolt 12 is tightened in this manner until arms 8 abut arms 62 and 64 of the adjoining yoke 56—see FIG. 6. Further tightening of bolt 12 then forces member 2 downwardly so that arms 8 push down on yoke 56 and thus on cup 50. This action exposes bearing cup 50—see FIG. 7. Once the bearing cup 50 is fully exposed it may be removed with the fingers. It should be noted that bearing 14 considerably eases the task of tightening bolt 12, especially when it is difficult to dismantle the joint so that considerable force must be applied to the bolt 12. It should also be noted that guides 26 prevent accidental skewing of member 15 within member 2 and thus ensure that fingers 18 remain firmly in contact and correctly lined with the inside surface of arm 58 of yoke 54. With cup 50 removed the remaining bearing cup 46 is removed from yoke 54 by moving the device to engage arm 60 of yoke 54 and the above procedure is repeated to push out cup 46. This procedure is repeated for the other two cups 48 and 52.

Figure 5:
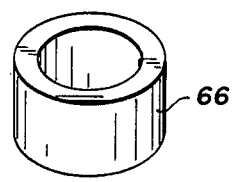
FIG. 5 illustrates a desirable feature of the invention.

To remove cups 48 and 52 a slightly different procedure may be followed, if desired. As arms 18 of member 2 now must rest on exposed bearing surfaces 44 of arm 46 and 50 of element 34 it is often desirable to provide a means of protecting the bearing surfaces 44. Accordingly a sleeve 66 of FIG. 5 may be positioned by sliding it over the bearing surfaces of arm 46 and 50 before arms 18 of member 2 are positioned. Subsequent removal of bearing cups 48 and 52 and element 34 is now performed using the procedure described above. Sleeve 66 is not essential but it is desirable.

With heavy duty universal joints, for example from a truck, it is desirable that the device of the present invention be fairly substantial and should include, for example, a back wall 68 and web 70 between fingers 15 to improve the rigidity of the structure. However with lighter weight joints the back wall 68 and web 70 are not necessary and the structure shown in FIG. 3 may be used.

I claim:

1. A device for dismantling a universal joint that comprises
    a bridge member having a central hole formed in it and parallel spaced arms extending from one side;
    a U-shaped grasping member having a threaded hole formed in its top and opposing fingers formed in its lower edge and a tightening bolt slidably received in the bridge member and threaded in the grasping member, the grasping member being received between the arms of the bridge member whereby tightening of the bolt moves the bridge member downwardly with respect to the grasping member.

2. A device as claimed in claim 1 in which a bracing member is attached to the crux of the U of the grasping member so as to prevent the sides from flexing.

3. A device as claimed in claim 1 in which a bearing is provided under the head of the bolt to rest on the bridge member to facilitate tightening of the bolt.

4. A device as claimed in claim 1 in which spaced, parallel guides are provided on the exterior of the grasping member to prevent the member rotating relative to the bridge member.

5. A device as claimed in claim 1 in which hollow sleeves are provided to protect the bearing surfaces of a universal joint.

6. A device for dismantling a universal joint, the universal joint including two yokes, each yoke formed with a pair of arms in a plane that is at right angles to the plane containing the other pair of arms, the arms of each pair being spaced from each other and each arm having an inside surface facing the other arm of the pair, the device comprising:
    a bridge member having spaced arms;
    a grasping member receivable between the spaced arms of the bridge member;
    opposed fingers on the grasping member able to contact the inside surface of an arm of a yoke;
    an opening in the bridge member, between the arms;
    an opening in the grasping member;
    a threaded shaft located in the openings to link the grasping member and the bridge member whereby turning the threaded shaft acts to move the bridging member and the grasping member relative to each other.

* * * * *